United States Patent
Chase

[11] Patent Number: 5,383,967
[45] Date of Patent: Jan. 24, 1995

[54] NATURAL SILICA-CONTAINING CEMENT AND CONCRETE COMPOSITION

[76] Inventor: Raymond S. Chase, 2855 Devonshire Rd., Ann Arbor, Mich. 48104

[21] Appl. No.: 197,620

[22] Filed: Feb. 17, 1994

Related U.S. Application Data

[63] Continuation of Ser. No. 914,006, Jul. 14, 1992, abandoned, which is a continuation of Ser. No. 677,481, Mar. 29, 1991, abandoned.

[51] Int. Cl.$^6$ .......................... C04B 7/02; C04B 11/30
[52] U.S. Cl. ..................... 106/737; 106/715; 106/735; 106/788
[58] Field of Search ............... 106/716, 718, 722, 735, 106/737, 738, 773, 782, 784, 788, 816, 715

[56] References Cited

U.S. PATENT DOCUMENTS

| | | | |
|---|---|---|---|
| 1,317,525 | 9/1919 | Romano | 106/737 |
| 1,912,883 | 6/1933 | Blank | 106/737 X |
| 2,597,370 | 5/1952 | Peckman | 106/715 |
| 2,876,123 | 3/1959 | Drummond | 106/718 X |
| 3,411,924 | 11/1968 | Lapshin | 106/722 |
| 3,597,249 | 8/1971 | Shannon | 106/737 X |
| 3,823,021 | 7/1974 | Jansen | 106/716 |
| 4,188,233 | 2/1980 | Juhasz | 106/716 |
| 4,231,801 | 11/1980 | Dunton | 106/813 X |
| 4,377,416 | 3/1983 | Maul et al. | 106/718 |
| 4,435,216 | 3/1984 | Diehl et al. | 106/813 X |
| 4,666,521 | 5/1987 | Colin | 106/737 X |

*Primary Examiner*—Karl Group
*Attorney, Agent, or Firm*—Howard & Howard

[57] ABSTRACT

A concrete composition including a naturally-occurring, mineralogic silica source material as part of the binder. The silica source material may be, for example, feldspars, naturally-occurring zeolites, diatomaceous earths, clinoptilites, mordenites, chabozites, opaline silicas, novaculites, vitreous volcanic rocks (rhyolites, dacites, latites, andesites and their tuffs, and basalts), and high silica rocks (such as quartzite sands, sandstones and many igneous and metamorphic rocks such as. granites and schists), among others, having at least 50% by weight silica. The cementitious binder of the concrete composition may have a silica content of about 20–40% by weight from the mineralogic material. The compositions exhibit improved strength and endurance, including greater density and smoothness which imparts significantly improved surface characteristics to the material.

13 Claims, No Drawings

NATURAL SILICA-CONTAINING CEMENT AND CONCRETE COMPOSITION

This is a continuation of copending application Ser. No. 07/914,006, filed on Jul. 14, 1992, now abandoned, which is a continuation of application Ser. No. 07/677,481, filed Mar. 29, 1991, now abandoned.

BACKGROUND OF THE INVENTION

The present invention is directed to an improved concrete material containing silica. The present invention also is directed to an improved blended cement conforming to the ASTM specifications of commercial standard C-595. Silica has previously been added to concrete in the form of a by-product from plants which produce magnesium and ferrosilicon, this by-product being known as "silica fume". Silica also is sometimes found in the raw materials such as limestone which are burned in the process for forming cement clinker. Silica in this form is an integral part of the portland cement clinker and does not perform in the same manner as the present invention.

Silica fume has found acceptance as an additive to increase the strength of concrete. However, silica fume suffers from disadvantages because of its relatively high cost and extreme difficulties in handling due to the extreme fineness of the material. In fact, the material can usually be transported to a job site only in bags or in some instances as a wet slurry. Thus, concrete which includes this silica strengthener has been considered as somewhat of a specialty product.

Moreover, the silica fume is considered to be a "thirsty" additive, increasing the water requirements to make the concrete workable. Additional water also reduces strength. Therefore, due to the increased water requirement, such concretes also require expensive water reducing chemicals to offset the extra water introduced for improving workability. Without the water reducing agents, the concrete has difficulty reaching its specified design strength.

The production of cement requires relatively large amounts of energy, much of it in the form of fossil fuels. Six to eight million BTU are normally required to produce one short ton (2000 lb) of finished cement. The provision of a component which would replace cement and thus reduce the overall amount of cement required in concrete would likewise reduce energy consumption in proportion to its use and also reduce the strain upon cement supplies. Similarly, proportional ecological benefits would be obtained through decreased emissions from cement production.

SUMMARY OF THE INVENTION

The present invention is based on the discovery that certain naturally-occurring, mineralogic materials have adequate silica content to be a useful element for the production of concrete. Examples of such materials include feldspars (especially feldspathic quartzites), naturally-occurring zeolites, diatomaceous earths, clinoptilites, mordenites, chabozites, opaline silicas, novaculites, vitreous volcanic rocks (rhyolites, dacites, lactites, andesites and their tuffs, and basalts), synthetic glass and high silica rocks (such as quartzite sands, sandstones and many igneous and metamorphic rocks such as granites and schists), and related mineralogic family members.

These mineralogic components can be comminuted and either added to the concrete directly or used as a component of a blended cement which can be used in forming the concrete mixture. The concrete obtained by use of this silica-containing component achieves higher strengths more quickly and forms a tighter, less porous surface than is generally achieved with normal concrete formulations.

DETAILED DESCRIPTION OF THE INVENTION

In general, concrete compositions include water, aggregates and a cementitious binder such as portland cement. In accordance with the present invention, a silica-based material can be added to the composition and the amount of portland cement in the binder reduced.

The silica-based material is a naturally occurring, mineralogic material. Examples include feldspars (especially feldspathic quartzites), naturally occurring zeolites, diatomaceous earths, clinoptilites, mordenites, chabozites, opaline silicas, novaculites, vitreous volcanic rocks (rhyolites, dacites, lactites, andesites and their tuffs, and basalts), synthetic glass and high silica rocks (such as quartzite sands, sandstones and many igneous and metamorphic rocks such as granites and schists), and related mineralogic family members, among others.

The naturally occurring mineralogic material should have a silica content of at least 50% by weight, preferably at least 70%, more preferably at least 90%. It is possible that lower silica contents in the mineralogic material could be used, particularly when other minerals in the material or additives in the final product provide beneficial effects. Suitable materials are available in the U.S. in the Pacific coast states and adjacent areas, the plains states and certain areas in the southeast. In particular, feldspathic quartzite deposits in the San Bernadino, Calif. quadrangle area near Barstow have been discovered to have the desired characteristics. In addition, large amounts of minerals with the desired characteristics are present in additional identifiable areas in California, Idaho, the Dakotas, Arkansas, Colorado, Texas, the Carolinas, Alaska, Hawaii and other areas. The materials thus are in plentiful supply in many areas of the U.S.

The amount of silica in the cementitious binder from the silica based mineralogic material would normally be approximately 20% to 40% by weight, since ASTM C-595 standards for blended cement allow for the presence of additives in amounts up to 40% of the final product. Although in most instances relatively large additions will be desired to maximize the economic benefits discussed above, it will be recognized that smaller amounts may be useful (e.g. 5% by weight and lower), so that the silica-based material could be used as an additive in some cases. Also, it should be noted that even higher levels of addition of the mineralogic material are contemplated. However, the resulting compositions might not necessarily be in compliance with current ASTM standards.

The mineralogic materials can be used in the process substantially in their form as removed from the earth. It is necessary only to comminute the materials to the desired particle size. After grinding, screening or air classification can be used to process the ground material and obtain a more uniform comminuted material having the desired particle size. For example, grinding the material so that no more than 34% of the material after grinding is retained on a 325 sieve pursuant to ASTM specification C-618 is adequate. This corresponds to a maximum particle size of about 45 microns or so. The material which is most active in the binder usually has a size of about 1–10 microns. Calcining also might be desirable to increase reactivity.

Even after screening or air classification, the particles used in the present invention would have an average particle size on the order of at least 1–5 microns or so. The fineness can also be expressed in terms of surface area per gram. A typical ground feldspathic quartzite may yield a fineness of about 4680 cm$^2$/g. For comparison, the value for portland cement would be about 3800 cm$^2$/g. Even if this quartzite material is separated, the value would be about 9800–10,000 cm$^2$/g. This is still less than a quarter as fine as silica fume, and hence no large increase in water demand is noted.

The present invention can be used with a variety of cements, including ASTM Types I, II, III, IV and V cements in accordance with ASTM commercial standard C150. Examples include portland cement, slag cement (usually about 40% blast furnace slag and 60% portland cement clinker) and oil well cements, including American Petroleum Institute Class A, B, C, G and H oil well cements.

The silica-based mineralogic materials can be formulated with the cement to form a blended cement to be used in producing concrete, or can be added to the concrete mixture at the time of formulation. In the former instance, the comminuted silica-based material can be added after formation of the cement clinker, either prior to or after addition of gypsum and any other desired additives, to form a blended cement. As noted above, ASTM commercial standard C595 allows blended cements such as portland-pozzolan cement to include up to 40% by weight of a material such as the present silica-based material. Blended slag cements are contemplated as well, in which case standard C595 allows replacement of up to about 15% of the portland cement clinker. Oil well cements are one example of an application where the mineralogic material would be added in the field at the time of use.

The naturally occurring, mineralogic materials will contain certain amounts of non-silica materials, which can be thought of as impurities. Some impurities will have a deleterious effect on the concrete composition if they are present above certain levels. These include magnesium oxide (e.g. in the form of periclase) and free lime (both of which can cause delayed expansion), sulfate, carbon which can cause air entrainment problems, moisture which can cause handling problems, alkalis which can cause expansion when alkali reactive aggregates are present, sugar and zinc compounds, which can cause problems through retardation of the setting time of the concrete. The maximum amount of MgO allowable is about 6.0% by weight (ASTM C-150), of sulfate about 4.0% by weight (ASTM C-618), of carbon 10% loss on ignition at 750° C. (ASTM C-618 Class N), of moisture about 3% by weight and of alkalis about 1.5% by weight. These amounts are expressed in terms of the total for the "blended cement," which includes the cement, the silica-based material and any other additives for the cement.

On the other hand, some impurities can provide beneficial effects. Examples include alumina, which can increase strength by reacting to form calcium alumino silicate hydrates, iron oxides, which similarly can increase strength by reacting to form calcium alumino iron hydrates, and low levels of alkalis, which can react with lime to increase pH and accelerate the dissolution of silica and alumina to lead to earlier gains in strength.

The naturally-occurring, mineralogic materials can be added to the concrete composition either in conjunction with the cementitious material or separately from the cementitious material. In the first case, an appropriate amount of the material can either be directly ground with the gypsum and clinker at the time the cement is made, or it can be blended with the cementitious material later. The present invention can also be used with certain mineral or chemical admixtures, which are presently used to provide increased strength and durability. Examples include water reducing agents, pozzolans, fiber glass remnants, metallic fibers and other natural or manufactured fiber-like materials, as well as others.

The concrete compositions of the present invention can be used in a variety of applications, including prestressed concrete, concrete block, concrete pavement, pre-cast panels, tilt-up panels, ready-mix concrete, etc. The less porous surface provided by the present compositions is especially advantageous in pavement applications since the less porous surface is much more resistant to penetration of salt and de-icing chemicals which tend to break down the pavement surface. Seaboard structures, harbor structures, buildings, docks, bridges, causeways, etc. also are subject to the same sort of salt attack. The increased strength, and therefore longevity and durability, provided by the present compositions also makes them suitable for specialty applications, such as containment of hazardous and radioactive wastes.

The use of natural silicates in portland cement concrete is beneficial because silicate ions are released at the high pH of the concrete pour solution and these silicate ions react with the lime produced from the cement hydration to produce additional calcium silicate hydration products.

The lime produced by the cement hydration process contributes nothing to the concrete strength and is a potential source of chemical attack. Conversion of the lime to a calcium silicate hydrate, therefore, enhances the strength gain as well as the long-term durability of the concrete. This occurs because of the absorption of the lime into the chemical reaction. Thus, these enhancements appear as a by-product of the reaction. The values of this unique occurrence are numerous since it brings to the final product the affinity for manufacturing concrete products with a much longer practical life, with attendant economies of lower maintenance costs as well.

The present invention is further illustrated by the following examples:

A naturally occurring feldspathic quartzite was tested for compliance as a Class N natural pozzolan as a component for producing a blended cement. The quartzite was ground to a size such that 12.6% was retained on a 325 sieve, the ASTM C-618 Specification being a maximum of 34%. The composition of the quartzite was analyzed and compared to the ASTM C-618 Specification for cement additives, with the results being shown below:

| CHEMICAL ANALYSES | | |
| --- | --- | --- |
| PARAMETER | RESULTS | ASTM C-618 SPEC. N |
| Silicon Dioxide, SiO$_2$, % | 74.32 | — |
| Aluminum Oxide, Al$_2$O$_3$ % | 13.43 | — |

-continued

CHEMICAL ANALYSES

| PARAMETER | RESULTS | ASTM C-618 SPEC. N |
|---|---|---|
| Iron Oxide, $Fe_2O_3$, % | 0.55 | — |
| Sum of $SiO_2$, $Al_2O_3$, $Fe_2O_3$, % | 88.30 | 70/50 min |
| Calcium Oxide, CaO, % | 0.88 | — |
| Magnesium Oxide, MgO, % | 0.27 | — |
| Sodium Oxide, $Na_2O$, % | 7.03 | — |
| Potassium Oxide, $K_2O$, % | 0.16 | — |
| Sulfur Trioxide, $SO_3$, % | 0.09 | 4.0 max |
| Moisture Content, % | 0.33 | 3.0 max |
| Loss on Ignition, % | 0.74 | 10.0 max |
| Available Alkalies as % $Na_2O$ | 0.33 | 1.5 max |

This material has been tested in accordance with ASTM C-311 procedures for physical parameters. Under the test procedures for pozzolanic strength activity index, a control mortar is prepared, including 1375 g of graded sand, 500 g of portland cement and 242 ml of water. A test mortar is prepared, including 1375 g of graded sand, 400 g of portland cement, 100 g of the quartzite component and water sufficient to obtain the consistency of the control mortar. The mortars are cured in saturated lime water at 73° F. and then tested for strength at 7 and 28 days. The strength activity index is the percent of strength of the test mortar compared to the control mortar. The results are shown below:

PHYSICAL ANALYSES

| PARAMETER | RESULTS | ASTM C-618 SPEC. N |
|---|---|---|
| Strength Activity Index of Portland Cement | | |
| % of Control at 7 days | 80 | 75 min |
| % of Control at 28 days | 81 | 75 min |
| Water Requirement, % of Control | 100 | 115 max |
| Specific Gravity | 2.62 | — |

This material was found to meet the ASTM C-618 specification for a natural pozzolan. Consequently, the material, when blended or inter-ground with either portland cement clinker or finished portland cement, meets the requirements of ASTM C-595 for blended cements.

Although a detailed description of the present invention has been provided above, the present invention is not limited thereto, but rather is defined by the following claims.

What is claimed is:

1. A concrete composition, comprising:
a cementitious binder of a cement which releases lime upon hydration and a comminuted mineralogic silica source material which reacts with the lime to form calcium silicate hydrate, which is active in the cementitious binder as a strengthener, so as to reduce the amount of lime in the concrete composition;
an aggregate material; and
water, wherein the silica source material, consists of feldspathic quartzite which is at least 50% by weight silica, has a maximum particle size of about 45 microns, an average particle size of about 1 to 10 microns, and a specific surface area of from 4680 to 10,000 square centimeters/gram.

2. The composition of claim 1, wherein the cementitious binder is about 20–40% by weight silica from the silica source material.

3. A method of producing a concrete composition, comprising mixing together a cement which releases lime upon hydration, an aggregate material, water and a mineralogic silica source material which reacts with the lime to form calcium silicate hydrate, which binds as a strengthener in the concrete composition, so as to reduce the amount of lime in the concrete composition
wherein the silica source material consists of feldspathic quartzite which is at least 50% by weight silica, said method including grinding said silica source material to produce a generally uniform comminuted material having a maximum particle size of about 45 microns, an average particle size of about 1 to 10 microns, and a specific surface area of from 4680 to 10,000 square centimeters/gram.

4. The method of claim 3, wherein the silica source material provides a silica content of about 20–40% by weight to the combination of the cement and the silica source material.

5. A blended cement, comprising:
gypsum;
portland cement clinker; and
a comminuted mineralogic silica source material which reacts with lime released from the gypsum and portland cement clinker upon hydration to form calcium silicate hydrate, which binds as a strengthener, so as to consume the lime released from the gypsum and portland cement clinker,
wherein the silica source material, consists of feldspathic quartzite which is at least 50 % by weight silica, has a maximum particle size of about microns, an average particle size of about 1 to 10 microns, and a specific surface area of from 4680 to 10,000 square centimeters/gram.

6. The blended cement of claim 5, further comprising blast furnace slag.

7. The blended cement of claim 5, wherein said blended cement contains no more than 6% by weight of magnesium oxide, contains no more than 4% by weight of sulfate, exhibits no more than a 10% loss of weight due to carbon upon ignition at 750 degrees centigrade, contains no more than 3% by weight of moisture and contains no more than 1.5% by weight of available alkalis.

8. A method of producing a blended cement, comprising mixing together gypsum, portland cement clinker and a mineralogic silica source material which reacts with lime released from the gypsum and portland cement upon hydration,
wherein said silica source material consists of feldspathic quartzite which is at least 50% by weight silica, and said method including grinding said silica source material to produce a generally uniform comminuted material having a maximum particle size of about 45 microns, an average particle size of about 1 to 10 microns, and a specific surface area of from 4680 to 10,000 square centimeters/gram.

9. The method of claim 8, wherein said blended cement contains from approximately 20% to approximately 40% by weight silica from the silica source material.

10. A concrete composition, comprising:
a cementitious binder of a cement which releases lime upon hydration and a comminuted mineralogic silica source material which reacts with the lime to form calcium silicate hydrate, which is active in the cementitious binder as a strengthener, so as to reduce the amount of lime in the concrete composition;

an aggregate material; and water, wherein the silica source material consists of feldspathic quartzite which is at least 50% by weight silica, has a maximum particle size of about 45 microns, an average particle size of about 1 to 10 microns, and a specific surface area of from 4680 to 10,000 square centimeters/gram.

11. A method of producing a concrete composition, comprising mixing together a cement which releases lime upon hydration, an aggregate material, water and a mineralogic silica source material which reacts with the lime to form calcium silicate hydrate, which binds as a strengthener in the concrete composition, so as to reduce the amount of lime in the concrete composition wherein the silica source material consists of feldspathic quartzite which is at least 50% by weight silica, said method including grinding said silica source material to produce a generally uniform comminuted material having a maximum particle size of about 45 microns, an average particle size of about 1 to 10 microns, and a specific surface area of from 4680 to 10,000 square centimeters/gram.

12. A blended cement comprising:
gypsum;
portland cement clinker; and
a comminuted mineralogic silica source material which reacts with lime released from the gypsum and portland cement clinker upon hydration to form calcium silicate hydrate, which binds as a strengthener, so as to consume the lime released from the gypsum and portland cement clinker,
wherein the silica source material consists of feldspathic quartzite which is at least 50% by weight silica, has a maximum particle size of about 45 microns, an average particle size of about 1 to 10 microns, and a specific surface area of from 4680 to 10,000 square centimeters/gram.

13. A method of producing a blended cement, comprising mixing together gypsum, portland cement clinker and a mineralogic silica source material which reacts with lime released from the gypsum and portland cement upon hydration,
wherein said silica source material consists of feldspathic quartzite which is at least 50% by weight silica, and said method including grinding said silica source material to produce a generally uniform comminuted material having a maximum particle size of about 45 microns, an average particle size of about 1 to 10 microns, and a specific surface area of from 4680 to 10,000 square centimeters/gram.

* * * * *

UNITED STATES PATENT AND TRADEMARK OFFICE
CERTIFICATE OF CORRECTION

PATENT NO. : 5,383,967
DATED : January 24, 1995
INVENTOR(S) : Raymond S. Chase

It is certified that error appears in the above-indentified patent and that said Letters Patent is hereby corrected as shown below:

In Claim 5, column 6, line 34 of the Patent after "about" insert --45--

Signed and Sealed this

Eleventh Day of April, 1995

Attest:

BRUCE LEHMAN

Attesting Officer     Commissioner of Patents and Trademarks